US012030078B2

(12) United States Patent
Schramm et al.

(10) Patent No.: US 12,030,078 B2
(45) Date of Patent: Jul. 9, 2024

(54) PLASMA TRANSFER WIRE ARC THERMAL SPRAY SYSTEM

(71) Applicant: FORD GLOBAL TECHNOLOGIES, LLC, Dearborn, MI (US)

(72) Inventors: Leander Schramm, Remda-Teichel (DE); Alexander Schwenk, Hachenburg (DE); Enrico Hauser, Langenbach b. K. (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 972 days.

(21) Appl. No.: 16/918,165

(22) Filed: Jul. 1, 2020

(65) Prior Publication Data

US 2020/0331012 A1 Oct. 22, 2020

Related U.S. Application Data

(62) Division of application No. 13/259,433, filed as application No. PCT/EP2010/054355 on Mar. 31, 2010, now Pat. No. 10,730,063.

(30) Foreign Application Priority Data

Mar. 31, 2009 (EP) .................................... 09156942

(51) Int. Cl.
*B05B 7/22* (2006.01)
*C23C 4/131* (2016.01)
(Continued)

(52) U.S. Cl.
CPC .............. *B05B 7/224* (2013.01); *C23C 4/131* (2016.01); *H05H 1/42* (2013.01); *B05B 7/06* (2013.01); *B05B 13/0636* (2013.01)

(58) Field of Classification Search
None
See application file for complete search history.

(56) References Cited

U.S. PATENT DOCUMENTS 2,766,361 A 10/1956 Landis et al.
3,280,364 A 10/1966 Sugawara et al.
(Continued)

FOREIGN PATENT DOCUMENTS

JP 61259777 A 11/1986
JP 62155957 A 7/1987
(Continued)

OTHER PUBLICATIONS

Machine translation of WO-0049193-A1, Jan. 2024 (Year: 2024).*
(Continued)

*Primary Examiner* — Geoffrey S Evans
(74) *Attorney, Agent, or Firm* — Vincent Mastrogiacomo; Brooks Kushman P.C.

(57) ABSTRACT

A plasma transfer wire arc thermal spray system includes a section for feeding a wire acting as a first electrode, a source of plasma gas providing plasma gas, a nozzle directing the plasma gas stream from the source of plasma gas to a free end of the wire, and a second electrode located in the plasma gas stream towards the nozzle. In certain instances, the nozzle is made at least partially of electrically insulating material. The thermal spray apparatus with the inventive spray gun may have a simplified and faster starting procedure and the spray nozzle can be more durable.

2 Claims, 5 Drawing Sheets

(51) Int. Cl.

| | |
|---|---|
| ***H05H 1/42*** | (2006.01) |
| *B05B 7/06* | (2006.01) |
| *B05B 13/06* | (2006.01) |

(56) References Cited

U.S. PATENT DOCUMENTS

| | | | | |
|---|---|---|---|---|
| 4,095,081 | A | | 6/1978 | Ashman |
| 4,370,538 | A | | 1/1983 | Browning |
| 4,492,337 | A | | 1/1985 | Harrington et al. |
| 4,580,031 | A | | 4/1986 | Bebber et al. |
| 4,681,258 | A | | 7/1987 | Jenkins et al. |
| 4,741,286 | A | | 5/1988 | Itoh et al. |
| 4,762,977 | A | | 8/1988 | Browning |
| 4,788,402 | A | | 11/1988 | Browning |
| 5,109,150 | A | | 4/1992 | Rogers |
| 5,296,667 | A | | 3/1994 | Marantz et al. |
| 5,442,123 | A | | 8/1995 | Arretz et al. |
| 5,808,270 | A | | 9/1998 | Marantz et al. |
| 5,938,944 | A | * | 8/1999 | Baughman .......... B05B 13/0636 427/446 |
| 5,958,520 | A | * | 9/1999 | Cook ........................ C23C 4/12 427/236 |
| 5,964,405 | A | | 10/1999 | Benary et al. |
| 6,001,426 | A | | 12/1999 | Witherspoon et al. |
| 6,245,390 | B1 | | 6/2001 | Branovski et al. |
| 6,372,298 | B1 | | 4/2002 | Marantz et al. |
| 6,398,125 | B1 | | 6/2002 | Liu et al. |
| 6,610,959 | B2 | | 8/2003 | Carlson et al. |
| 6,685,524 | B2 | | 2/2004 | Moriyama et al. |
| 6,703,579 | B1 | * | 3/2004 | Rice ........................ C23C 4/131 219/76.16 |
| 6,706,993 | B1 | * | 3/2004 | Chancey .............. B23K 10/027 219/121.48 |
| 2002/0185473 | A1 | * | 12/2002 | Carlson ................... B05B 7/224 219/76.15 |
| 2003/0000823 | A1 | | 1/2003 | Uhm et al. |
| 2012/0018407 | A1 | | 1/2012 | Schramm et al. |

FOREIGN PATENT DOCUMENTS

| | | | | | |
|---|---|---|---|---|---|
| JP | 63072888 | | | 4/1988 | |
| JP | 63277747 | A | | 11/1988 | |
| JP | 07303971 | A | | 11/1995 | |
| JP | 2000005664 | A | | 1/2000 | |
| JP | 20030368469 | A | | 3/2003 | |
| JP | 2005139471 | A | | 6/2005 | |
| JP | 2006212624 | A | | 8/2006 | |
| JP | 4013997 | B2 | | 11/2007 | |
| RU | 1798084 | A1 | | 2/1993 | |
| RU | 2259262 | C1 | | 8/2004 | |
| SU | 172423 | | | 1/1963 | |
| SU | 202714 | | | 1/1965 | |
| SU | 305032 | | | 1/1969 | |
| WO | 9835760 | A1 | | 8/1998 | |
| WO | WO-0049193 | A1 | * | 8/2000 | ............... C23C 4/02 |

OTHER PUBLICATIONS

Verpoort, C. et al., "Thermal Spraying of Nano-Crystalline Coatings for AI-Cylinder Bores," SAE Technical Paper Series, 2008-01-1050, Apr. 14-17, 2008, Detroit, Michigan, pp. 1-10.

European Search Report dated Nov. 15, 2011 for corresponding European Appn. No. EP 09156942.6 filed Mar. 31, 2009, 3 pgs.

Japanese Notice for Reasons for Rejection dated Jan. 28, 2014, JP Appn. No. 2012-502680, 4 pgs.

Japanese Notice of Allowance dated Jan. 15, 2015, JP Appn. No. 2012-502680, 3 pgs.

PCT Search Report dated Jul. 19, 2010 for the corresponding PCT Appn. No. PCT/EP2010/054355 filed Mar. 31, 2010, 2 pgs.

Russian Office Action dated Jul. 8, 2015, RU Appn. No. RU-0199751-UN-68, 7 pgs.

Russian Office Action Inquiry dated Sep. 24, 2014, RU Appn. No. 2011143882/02(065806), Applicant Ford Global Technologies, LLC, 3 pgs.

English Translation of Russian Office Action Inquiry dated Sep. 24, 2014, RU Appn. No. 2011143882/02(065806), Applicant Ford Global Technologies, LLC, 3 pgs.

* cited by examiner

PLASMA TRANSFER WIRE ARC THERMAL SPRAY SYSTEM

CROSS-REFERENCE TO RELATED APPLICATIONS

This application is a divisional of U.S. patent application Ser. No. 13/259,433 filed Sep. 23, 2011, now U.S. Pat. No. 10,730,063, issued on Aug. 4, 2020, which is the U.S. national phase of PCT Appln. No. PCT/EP2010/054355, filed Mar. 31, 2010 which claims priority to European application EP 09156942.6, filed Mar. 31, 2009, the disclosures of which are incorporated in their entirety by reference herein.

DESCRIPTION

This invention relates generally to a plasma transfer wire arc thermal spray system and a method of thermally spraying materials and, in particular, to a thermal spray apparatus with a spray gun having a simplified and faster starting procedure.

Thermal spraying provides a sophisticated and economic technical solution for the application of a high performance, wear resistant coating of materials of lesser resistance. Thermal spraying of metal droplets generated by powder or wire feed is a common procedure to coat metal surfaces. Thereby a substrate of a material which has inferior properties for the application may be coated by a plasma sprayed coating of a higher hardness and other favorable properties for the application and used instead of having a part consisting completely of a material with the superior properties. Thereby it is also possible to combine favorable properties of the substrate material e.g. light weight etc. with hardness of the applied coating material which can have a high specific weight.

A typical example of such an application of thermal spraying—although not constricted to such use—is the coating of light metal engine cylinder blocks with low friction and thermally conductive coatings on the cylinder bore walls.

Different process alternatives have been developed in recent years.

A particularly useful high pressure plasma coating process is the Plasma Transferred Wire Arc ("PTWA") process. The PTWA process is capable of producing high quality metallic coatings for a variety of applications such as the coating of engine cylinder bores. In the PTWA process, a high pressure plasma is generated in a small region of space at the exit of a plasma torch. Continuously metallic wire is fed into this region where the wire is melted; atomized and the droplets are carried away by the plasma. High speed gas emerging from the plasma torch directs the molten metal towards the surface to be coated. PTWA systems are high pressure plasma systems. Specifically, the PTWA thermal spray process melts a feedstock material, usually in the form of a metal wire or rod, by using a constricted plasma arc to melt the tip of the wire or rod, and removing the molten material with a high-velocity jet of partially ionized gas plasma from a constricting orifice. The ionized gas is also called a plasma and hence the name of the process. Plasma arcs operate typically at temperatures of 10.000-14.000° C. A plasma arc is a gas which has been heated by an electric arc to at least a partially ionized condition, enabling it to conduct an electric current.

A plasma exists in any electric arc, but in the context of this application the term plasma arc is associated with plasma generators which utilize a constricted arc. One of the features which distinguishes plasma arc devices from other types of arc generators is that, for a given electrical current and plasma gas flow rate, the arc voltage is significantly higher in the constricted arc device. In addition, a constricted arc device is one which causes all of the gas flow with its added energy to be directed through the constricted orifice resulting in very high exiting gas velocities, generally in the supersonic range. There are two modes of operation of constricted plasma torches—non-transferred mode and transferred mode. The non-transferred plasma torch has a second electrode and a first electrode in the form of a nozzle. In general, practical considerations make it desirable to keep the plasma arc within the nozzle with the arc terminating on the inner nozzle wall. However, under certain operating conditions, it is possible to cause the arc to extend outside the nozzle bore and then fold back, establishing a terminal point for the arc on the outside face of the first electrode constricting nozzle. In the transferred arc mode, the plasma arc column extends from the second electrode through a constricting nozzle. The plasma arc extends out of the torch and is terminated on supply first electrode of material which is electrically spaced and isolated from the plasma torch assembly.

In the plasma transferred wire arc thermal spray process, the plasma arc is constricted by passing it through an orifice downstream of the second electrode. As plasma gas passes through the arc, it is heated to a very high temperature, expands and is accelerated as it passes through the constricting orifice often achieving supersonic velocity on exiting the orifice towards the tip of the wire. Typically plasma gases used for the plasma transferred wire arc thermal spray process are air, nitrogen, noble gases, sometimes in a mixture with other gases, like a mixture of argon and hydrogen. In this mixture the light hydrogen molecules are responsible for the heat transport whereas the argon molecules provide good transport capacity for the molten material. The intensity and velocity of the plasma is determined by several variables including the type of gas, specific weight of the gas atoms/gas molecules, its pressure, the flow pattern, the electric current, the size and shape of the orifice and the distance from the second electrode to the wire. The prior art plasma transferred wire arc processes operate either on direct current from a constant current type power supply.

A second electrode—often made of copper or tungsten—is connected to the negative terminal of a power supply through a high frequency generator which is employed to initiate a first electrical arc (pilot arc) between the second electrode and a constricting nozzle. In the prior art the high frequency arc initiating circuit is completed by allowing direct current to flow from the positive terminal of power supply to the constricting nozzle to the negative terminal of the power supply while using a gas mixture for initiating the plasma having a high percentage of light heat transport molecules, such as hydrogen. This action heats the plasma gas which flows through the orifice. The orifice directs the heated plasma stream from the second electrode towards the tip of the wire which is connected to the positive terminal of the power supply. The plasma arc attaches to or "transfers" to the wire tip and is thus referred to as a transferred arc. For constant supply of coating material the wire is advanced forward e.g. by means of wire feed rolls, which are driven by a motor.

When the arc melts the tip of the wire, the high-velocity plasma jet impinges on the wire tip and carries away the molten metal, simultaneously atomizing the melted metal into fine particles and accelerating the thus formed molten particles to form a high-velocity spray stream entraining the fine molten particles. In the prior art in order to initiate the transferred plasma arc a pilot arc had to be established. A pilot arc is an arc between the second electrode and the constricting nozzle which is used as first electrode. This arc is sometimes referred to as a non-transferred arc because it does not transfer or attach to the wire as compared to the transferred arc which does. A pilot arc provides an electrically conductive path between the second electrode within the plasma transferred wire arc torch directed to the tip of the wire so that the main plasma transferred arc current can be initiated.

The most common technique for starting the pilot arc is to strike a high frequency or a high voltage direct voltage (DC) spark between the second electrode and the constricting nozzle lead ionized gas in the path thereof. A pilot arc is then established across this ionized path generating a plasma plume using high pressure plasma gas with a comparatively high content of light molecules for heat transport. This plasma plume extends outside of the nozzle due as a stream of ionized gas—i.e. the plasma. When the plasma plume of the pilot arc touches the wire tip, the electrically conductive path from the second electrode to the first electrode wire tip is established. The constricted transferred plasma arc will follow this path to the wire tip. For sustaining the plasma arc a gas plasma having less light molecules is suitable providing better droplet transport capacity.

A good overview of the PTWA method and system may be taken from SAE 08M-271: "Thermal Spraying of Nano-Crystalline Coatings for Al-Cylinder Bores" by C. Verpoort et al., from U.S. Pat. No. 5,808,270 and from U.S. Pat. No. 6,706,993 which address a number of problems in the prior arc related to plasma torch operation. The aforesaid SAE 08M-271; U.S. Pat. Nos. 5,808,270 and 6,706,993 are hereby incorporated by reference. Such problems include, inter alia problems associated with the starting of the PTWA system. A problem with the known plasma torches is their rather limited lifetime. The starting of the pilot arc tend to erode the electrically conductive material of the nozzle thus leading to deterioration thereof.

Further starting of the torch is time consuming as the establishment of the pilot arc and transfer thereof to the wire feed is cumbersome. When transferring the main arc partial arcs can ensue at the exit of the nozzle leading to erosion thereof and to instability in the melting of the wire. This may further lead to short-circuits in the system and further partial arcs that lead to early erosion of torch components. These instabilities lead to a so called "spitting" i.e. an irregular melting of the wire and to irregular coating. Further nowadays often the plasma has hydrogen up to 35 Vol. % leading to a heavy thermal load onto the torch components due to the high heat transfer capacity thereof and to a shorter lifetime of the torch. As the ignition of the torch is cumbersome it must be kept running even after finishing the coating. Accordingly, there exists a need for an improved plasma spray torch.

U.S. Pat. No. 4,762,977 discloses a flame spray system with an electrically insulated nozzle. The nozzle is surrounded by an additional air supply to avoid double arcing which may result from a stop of the wire feed when the plasma torch is in action. The additional air supply results in higher cost of machinery and operation. Further this system is not designed to improve starting the torch with the pilot arc.

The object of the invention is to provide an improved plasma torch to overcome the problems as discussed above.

The present invention overcomes the problems encountered in the prior art by providing a plasma transferred wire arc torch assembly according to claim 1.

This is accomplished with a nozzle being electrically insulated to the first electrode and comprising an electric insulation.

By surrounding the plasma path by this insulated nozzle the starting spark is forced to establish itself between the second electrode and the wire which is now acting as first electrode and the thus the wear occurring during the start-up phase on the nozzle is hindered. The electric insulation is arranged such that the pilot arc shall not get in contact with the nozzle during the start of the torch. Thereby the electric insulation can be arranged at the front side of the nozzle, at the nozzle orifice and/or the back side of the nozzle. In all cases the effect of the insulation is such that there is no decline of the electric potential in the nozzle alongside the pilot arc.

Further, with the insulated nozzle the amount of current for the spray process can be increased up to 200 A and more direct from ignition of the pilot arc, while nozzles from prior art are suitable only from 35 to 90 A during start-up. The higher current increases the power of the process and therefore spraying can be done faster and more efficient.

Preferably the electric insulation is arranged at the front side of the nozzle, because during start of the torch the position of the wire end may vary. The electric insulation avoids any disturbed or partial arcs between wire and nozzle because no electric arc can be established in the near distance between wire and front side of the nozzle. Thus a stable pilot arc is achieved.

Preferably the electric insulation can be achieved by a nozzle made at least partially of an electrically insulating material with high thermal resistivity. Any design is possible as long as the nozzle does not comprise a decline in the electric potential alongside the pilot arc. A preferred embodiment is to have a nozzle made completely from insulating material, so no decline in the electric potential can occur.

In another preferred embodiment the electric insulation is realized by covering the nozzle at least partially with electrically insulating material. All areas of the nozzle which can be contacted by the pilot arc are covered with a suitable electric insulation. Preferably the covering is a ceramic layer.

In another preferred embodiment the nozzle comprises electrically conductive material at its back side and/or the nozzle orifice and the conductive material is connected electrically to the second electrode and/or is acting as the second electrode. Such a nozzle comprises an electric contact to the plasma in the plasma source and/or in the nozzle orifice. The nozzle's inner surfaces surrounding the plasma source are highly subjected to the swirling plasma stream, resulting in an favourable establishment of the ignition arc.

Preferably a nozzle body or an inner part is made of the conductive material. If the nozzle body is made of conductive material, than it would comprise an insulation at the front side of the nozzle towards the wire. Additionally the nozzle orifice can be covered with a non-conductive layer. If the inner part of the nozzle is made of non-conductive material, it can comprise the nozzle orifice with then is conductive, too. The inner part also can be covered in the nozzle orifice with a non-conductive layer. Alternatively an outer part of the nozzle, made from non-conductive material, comprises the nozzle orifice. In all cases the back side of the nozzle is acting as a second electrode, either alone or in conjunction with an additional, separate arranged second electrode.

Until now it was assumed that the transfer of an initiating spark over a distance like e.g. 0.6-1.3 cm in a plasma torch for starting an arc is impossible. Surprisingly it has been found that when surrounding the plasma channel at least partially by insulated nozzle the starting spark extends through the nozzle channel and attaches to the feed wire. The nozzle itself has at least one part whereas the arc is transferred from the second electrode directly through the inner nozzle diameter to the wire as the exclusive first electrode without the step of providing a first arc and the transferred wire arc between the wire and the second electrode. Accordingly, the plasma transferred wire arc torch assembly of the present invention does have a longer lifetime than those of the prior art as the nozzle is not worn in the ignition cycle due to erosion and overheating by the first electrode attachment of the pilot arc/striking the primary arc. Further the step of starting a pilot arc can be omitted leading to a faster start of the PTWA process.

Specifically, the nozzle of the present invention is made at least partially of a highly wear-resistant, and heat-resistant insulating (electrically non conductive) material e.g. ceramics like SiN, BN, SiC, $Al_2O_3$, $SiO_2$, $ZrO_2$, high temperature resistant glass-ceramics or the like. Such material can stand high temperatures and is wear resistant while providing a reduction in the costs of the plasma transferred wire arc torch assembly by providing a longer life time and saving parts necessary for providing the primary arc.

When using a two-part nozzle it may be useful to have an insulating ring of $Al_2O_3$, SiN, BN, $ZrO_2$ or glass ceramics and an additional metal inlet of copper or copper having a tungsten insert.

In another embodiment of the present invention, a method of operating a plasma torch for coating a surface with a metallic coating utilizing the plasma transferred wire arc torch assembly of the present invention is provided. The method of the invention comprises initiating and sustaining a plasma in a plasma gun which incorporates the plasma transferred wire arc torch assembly of the present invention.

When starting the torch, the following steps are used:

Supplying plasma gas and powering the second electrode with open-circuit voltage; applying high voltage; thereby providing a conductive channel in the plasma gas for the main arc between second electrode and wire; and providing current flow from the main power source and starting feeding wire while spraying.

The method according to the invention is easy to start and thus the torch may be switched off after coating and switched on again when coating the next workpiece without a time-consuming starting modus. The ignition is provided in the same gas atmosphere as used for the spraying step. So process steps, time and material can be saved compared with the state of the art. The nozzle life time is extended considerably while the spraying process is proceeding with higher velocity as no complicated starting steps are necessary.

Further the stability and reliability of the spraying process is enhanced.

Due to the fact that an isolated nozzle is used new geometric shapes thereof are applicable adapted to optimum flow characteristics and minimized build-up of residues at the nozzle. For example the nozzle can be designed as a Laval nozzle which requires lower gas pressures for achieving supersonic velocities of the plasma gas stream.

By means of the new, electrically isolated nozzle new second electrode-geometries may be used in the PTWA torch. E.g. a finger-like second electrode may be used instead of a flat second electrode thus leading to a better cooling of the second electrode by the plasma gas.

Below, the invention will be described in detail with reference to the drawing, in which FIG. 1 is a schematic of a PTWA gun of the state of the art showing schematically relevant components of a thermal spraying gun;

Reference will now be made in detail to presently preferred compositions or embodiments and methods of the invention, which constitute the best modes of practicing the invention presently known to the inventors. In one embodiment of the present invention, an improved PTWA spray gun is proved. The spray gun of the present invention is a component in a plasma transferred wire arc thermal spray apparatus that may be used to coat a surface with a dense metallic coating. The spray gun of the present invention includes an assembly that has a wire feed guide section for introducing wire into a plasma torch, a secondary gas section for introducing a secondary gas around the plasma formed by the plasma torch, and a nozzle section for confining a plasma formed by the plasma torch.

Figure 1:
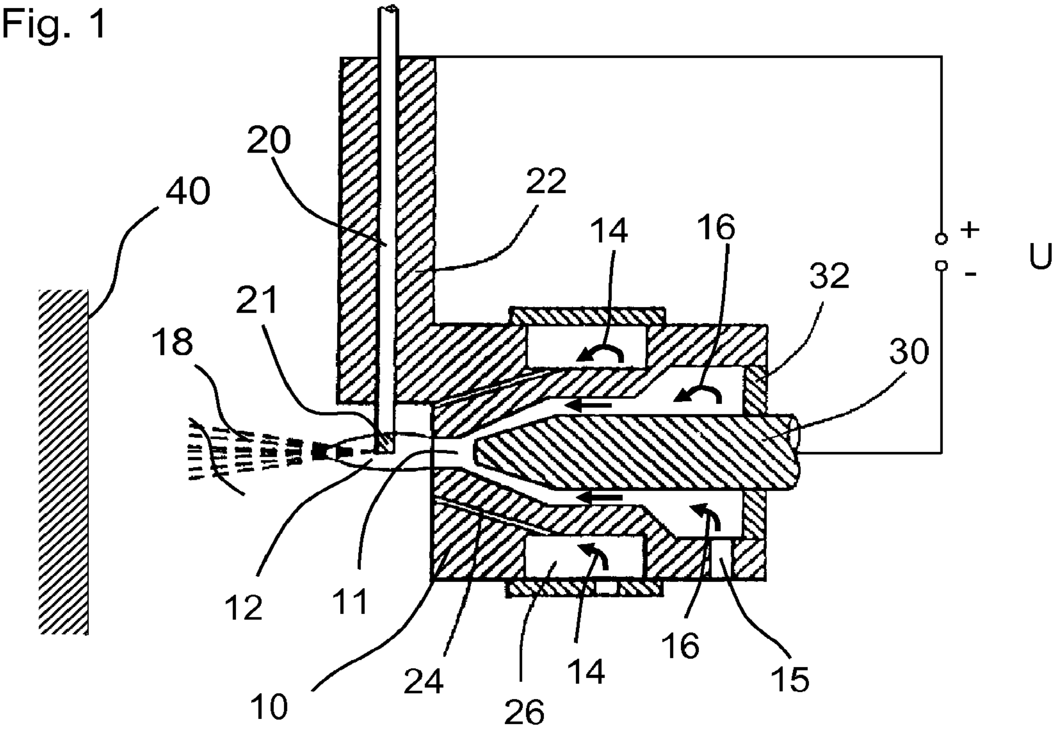

With reference to FIG. 1, a schematic drawing of a thermal spraying process is shown. In thermal spraying using wire a wire 20 is continuously fed into the heat source, where the material is at least partially molten. The electrically provided heat source thereof is a plasma or arc. The PTWA has a plasma generator or gun head comprising a nozzle 10 with a nozzle orifice 11, an electrically conductive consumable wire 20 connected as first electrode and a second electrode 30. The second electrode 30 is insulated to the nozzle 10 by an insulating body 32. Electric power is applied as indicated by the power source U as a direct current, whereas the positive potential is connected to the wire 20 and the negative potential is connected to the second electrode 30.

This head is normally mounted onto a rotating spindle (not shown). The wire 20 is fed perpendicularly to the center nozzle orifice 11 of the nozzle 10. The second electrode 30 is circulated by an ionized gas mixture also called gas plasma 16, provided by a plasma gas source 15. The plasma gas 16 exits the nozzle orifice 11 as a plasma jet 12 at high, preferably supersonic velocity and completes the electrical circuit when meeting the consumable wire 20 as first electrode.

Transport secondary gas 14 is added through secondary gas orifices 24 in the nozzle 10 surrounding the plasma jet 12. The secondary gas 14 works as secondary atomizer of the molten droplets formed from the wire 20 and support transferring the droplets as a metal spray 18 onto the target surface. Preferably the secondary gas 14 is compressed air.

Plasma transferred wire arc thermal spray apparatus is shown to include the plasma torch gun. During operation as set forth below, plasma jet 12 and metal spray 18 emerge from plasma torch gun. The assembly includes a nozzle 10 which has a cup-shaped form with a nozzle orifice 11 located at the center of the cup-shaped form. Second electrode 30, which may be constructed from any material known to the expert for this purpose, like 2% thoriated tungsten, copper, zirconium, hafnium or thorium for easy electron exit, is located coaxial with the nozzle orifice 11 and has second electrode free end. The second electrode 30 is electrically insulated from nozzle orifice 11 and an annular plasma gas chamber is provided by the nozzle internally between the second electrode 30 and the inner walls of the nozzle 10 and insulating body. In addition, a separate secondary gas inlet 26 for the secondary gas is formed within the outer section of the nozzle 10. Secondary gas inlet 26 leads to secondary gas orifices 14 in the nozzle section to provide an enveloping secondary gas stream around the plasma jet 12.

Wire feed section 22 is mechanically connected to nozzle 10 and formed within the assembly. Wire feed section 22 made of isolating or non-isolating material holds the consumable wire 20. In operation of the apparatus wire 20 is constantly fed by means known in the art, like wire feed rolls through feed guide. A free wire end 21 emerges from wire feed section 22 and contacts the plasma jet 12 opposite to the nozzle orifice 11 to form a metal spray 18. In operation, metal spray 18 is directed towards a surface 40 to be coated.

The positive terminal of the power supply is connected to the wire 20 and the negative terminal is connected to the second electrode 30. For certain conditions a high-frequency current can be added to the direct current during the start-up phase, but is not necessarily required. Simultaneously, the high voltage power supply is pulsed "on" for sufficient time to strike a high voltage arc between the second electrode 30 and the wire tip 21. The high voltage arc thus formed provides a conductive path for the DC current from the plasma power supply to flow from the second electrode 30 to the wire 20. As a result of this electrical energy, the plasma gas is intensely heated which causes the gas, which is in a vortex flow regime, to exit the nozzle orifice 11 at very high velocity, generally forming a supersonic plasma jet 12 extending from the nozzle orifice 11. The plasma arc thus formed is an extended plasma arc which initially extends from the second electrode 30 through the core of the vortex flowing plasma jet 16 to the maximum extension point. The high velocity plasma jet 12, extending beyond the maximum arc extension point provides an electrically conductive path between the second electrode 30 and free end 21 of the wire 20.

A plasma is formed between second electrode 30 to wire 20 causing the wire tip to melt as it is being continuously fed into the plasma jet 12. A secondary gas 14 entering through openings 24 in the nozzle 10, such as air, is introduced under high pressure through peripheral openings 26 in the nozzle 10. This secondary gas is distributed to the series of spaced bores. The flow of this secondary gas 14 provides a means of cooling the wire feed section 22, nozzle 10, as well as providing an essentially conically shaped flow of gas surrounding extended plasma jet 12. This conically shaped flow of high velocity secondary gas intersects with the extended plasma jet 12 downstream of the free end 21 of wire 20, thus providing addition means of atomizing and accelerating the molten particles formed by the melting of wire 20 and creating the metal spray 18.

Figure 2:
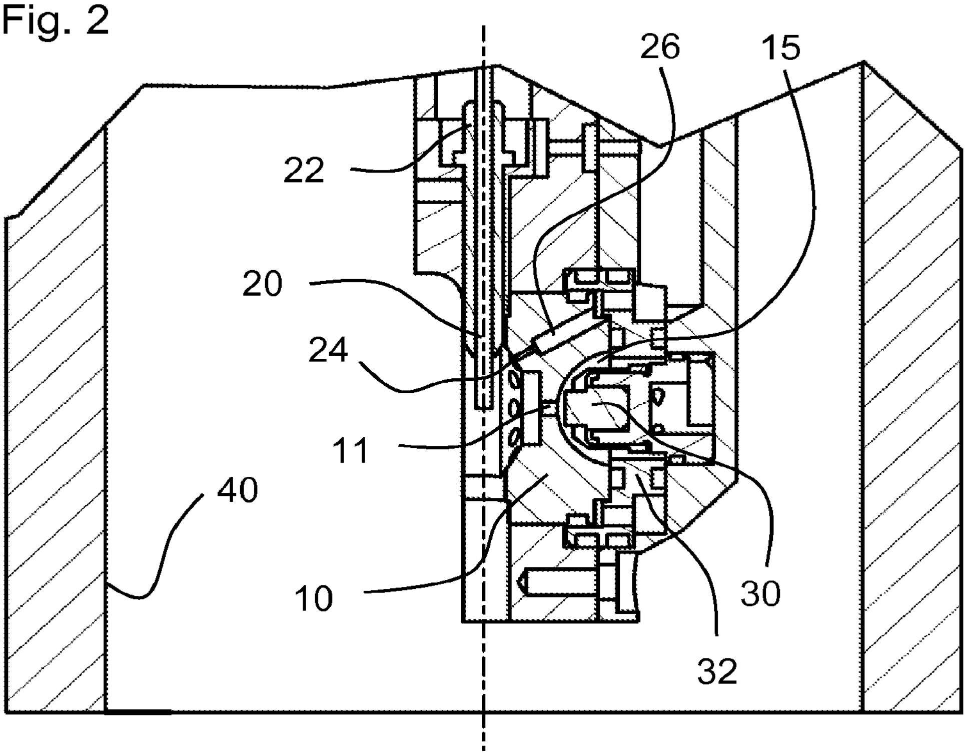
FIG. 2 is a part of a spray gun according to the invention in cross-section.

FIG. 2 shows schematically a section through a torch head according to the invention used in the spraying process according to the invention. Here, the whole nozzle 10 is made of a non-conductive material such as ceramics. This results in an insulating of the whole nozzle 10 against the wire 20 respectively the first electrode. In operation, plasma gas enters into the internal chamber formed by nozzle 10 and insulating body 32 surrounding the second electrode 30. The plasma gases flow into chamber and form a vortex flow being forced through the nozzle orifice 11.

An example of a suitable plasma gas can be a gas mixture consisting of 88% argon and 12% hydrogen. The heavier gas molecules, like Argon, are necessary for the kinetic energy of the plasma, whereas the light $H_2$ or He molecules are necessary for heat transfer. Hydrogen is considered useful for heat transfer, but may have limitations. So it could be replaced by He. Other gases have also been used, such as nitrogen, argon/nitrogen mixtures, noble gases and mixtures thereof, nitrogen/hydrogen mixtures as they are known to the expert in the field. The gases depend inter alia on the metal to be sprayed and on the geometry of the apparatus.

Different to the prior art process, no pilot plasma is required. Power supply can be activated with full power, which leads immediately to an electric arc between wire 20 as first electrode and second electrode 30. Because of the insulated nozzle 10 there is no pilot arc between nozzle 10 and second electrode 20, which results in an significant reduction of wear of the nozzle 10. Further the start-up procedure of the process is accelerated, because no pilot phase is required. That means the spray process can start immediately without delay. Thus the spray process can start each time when the spray torch is positioned on a new surface for coating. No idling process is necessary during positioning of the torch in different bores of an engine block for example. The process can start in each bore. This reduces power consumption, wire feed and gas consumption.

Figure 3:
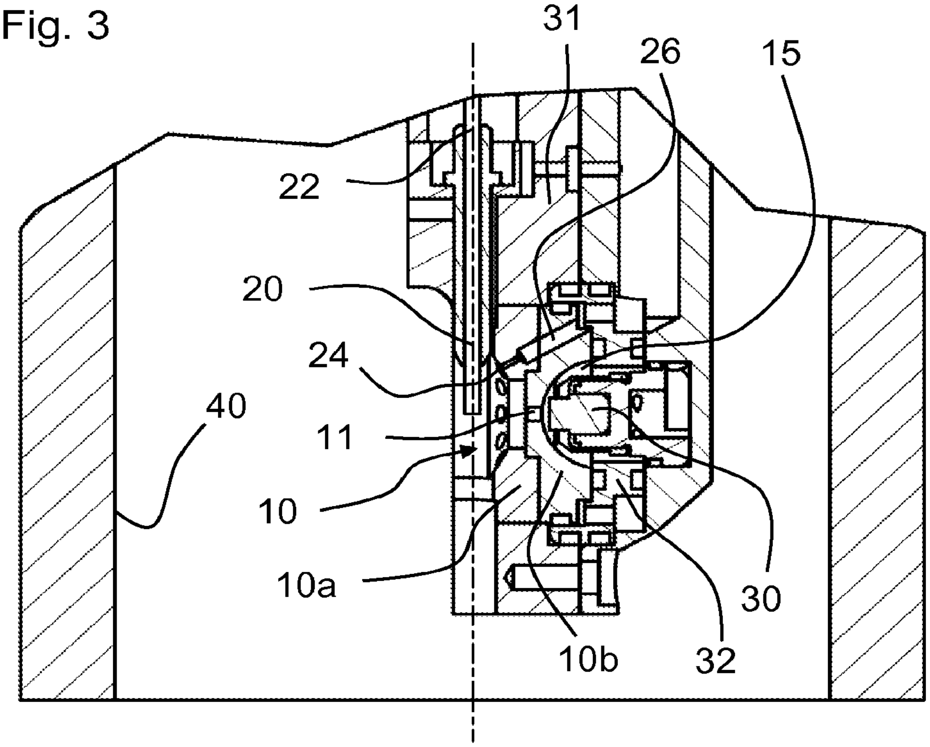
FIG. 3 is a part of a spray gun according to FIG. 2 having a two-part nozzle in cross-section.

In FIG. 3 another embodiment of the plasma torch assembly according to the invention is shown wherein the nozzle part 10 is made of two parts 10*a*, 10*b*, whereas the outer part 10*a* is made of ceramics and is located between the wire 20 and the inner part 10*b*, thus insulating the nozzle 10 against the wire 20. The inner part 10*b* comprises the nozzle orifice 11. To ensure insulation of the inner part 10*b* towards the torch support the nozzle carrier is made of a non-conductive material, too.

Figure 4:
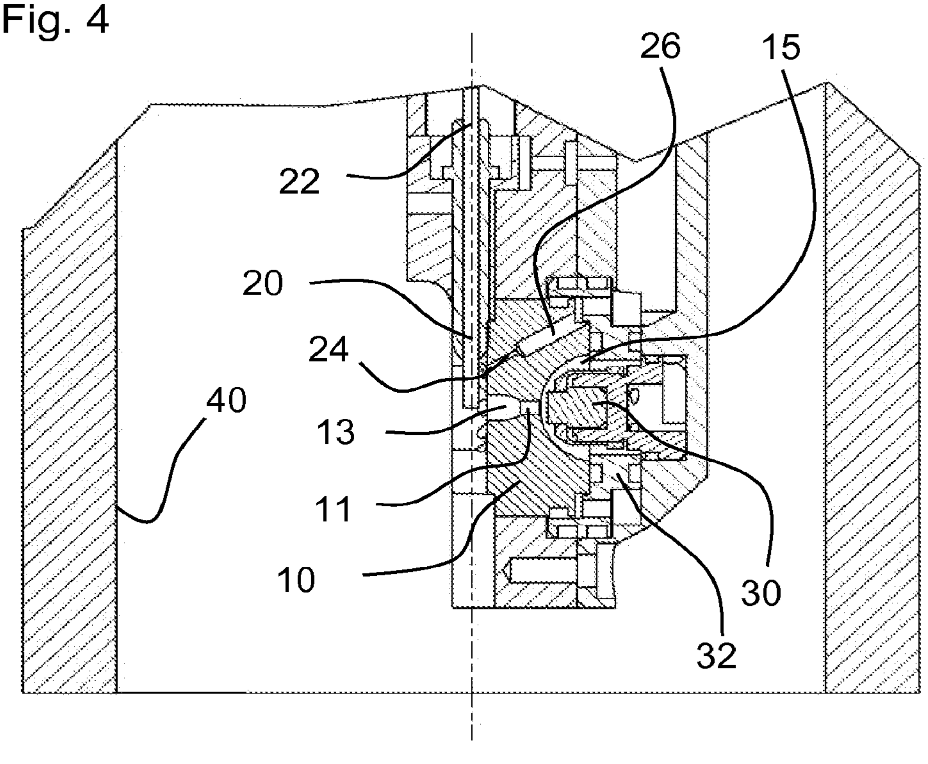
FIG. 4 is a part of another embodiment of a spray gun according to the invention in cross-section.

FIG. 4 shows another embodiment of a nozzle 10 in a plasma torch according to the invention. Nozzle 10 is formed as a Laval nozzle 13 and has a rather small diameter behind the nozzle orifice 11. Thus the plasma stream 16 will accelerate to supersonic speeds in plasma jet 12 without requiring high pressures in the plasma gas source. In this embodiment the whole body of the nozzle 10 is made from one single ceramic material, e.g. SiC, $ZrO_2$, $Al_2O_3$ or the like.

Figure 5:
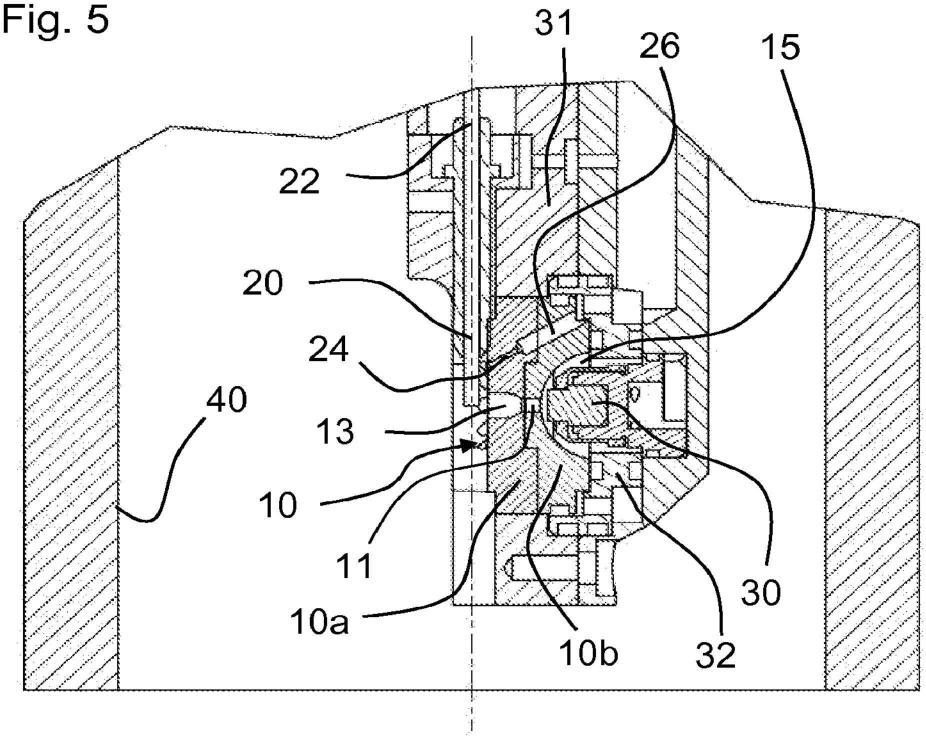
FIG. 5 is a part of the spray gun according to FIG. 4 having a two-part nozzle in cross-section.

In FIG. 5 the Laval nozzle 14 from FIG. 4 is made of two parts, whereas the primary part of the Laval nozzle 13 is incorporated in the insulated ceramic outer part 10*a*, while the nozzle orifice 11 is located in the inner part 10*b*. The inner part 10*b* is made from copper, whereas the outer part 10*a* is made from insulating material as $ZrO_2$, $Al_2O_3$, SiC, B etc. The inner part 10*b* is supported by the nozzle carrier 31, which is made of an non-conductive material.

Due to the Laval nozzle 13 the embodiments of FIGS. 4 and 5 have a different gas management. The primary gas is ejected in a more concentrated plasma jet 12 and enveloped by a secondary gas stream, thereby leading to higher spray velocities and less overspray when compared to the geometry of FIGS. 2 and 3.

Figure 6:
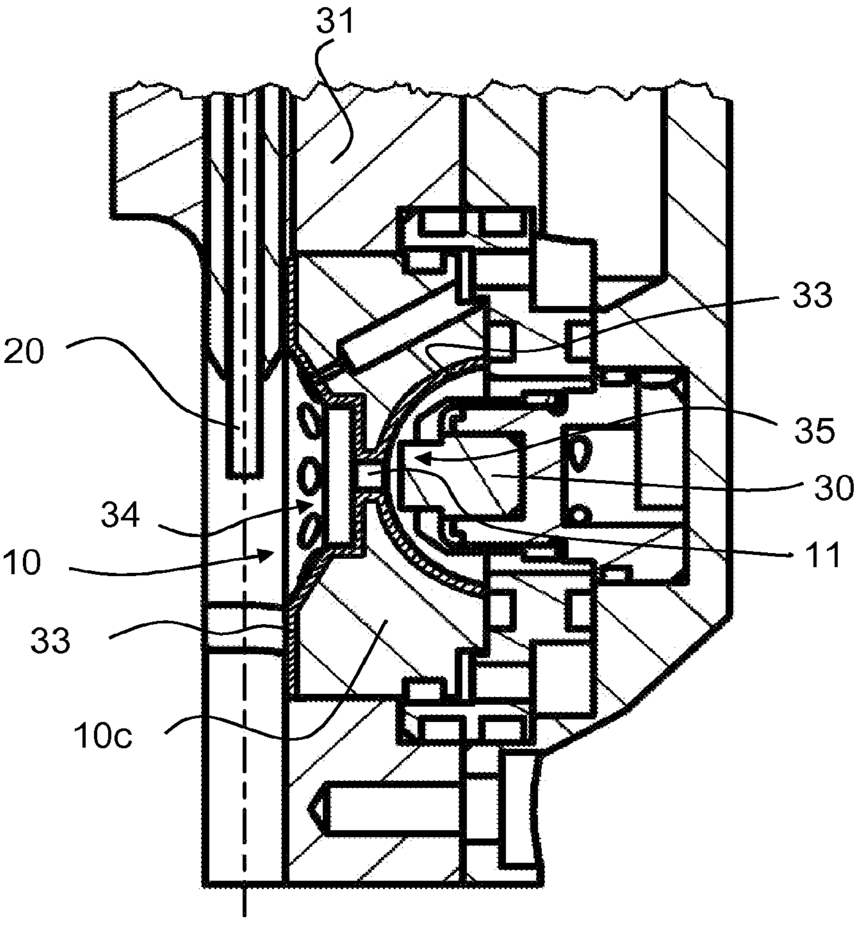
FIG. 6 is an enlarged cross section of a spray gun with a nozzle comprising a non-conductive cover.

FIG. 6 shows schematically a section through a torch head according to the invention similar to FIG. 2. While in FIG. 2 the nozzle 10 is made of a non-conductive material, the nozzle 10 in FIG. 6 comprises an insulating cover 33 as the electric insulation. The body of the nozzle 10*c* is made of a conductive material like copper or brass. The surfaces of the front side 34, of the back side 35 and in the nozzle orifice 11, i.e. all surfaces directed to the electrode 30, the wire 20 or the nozzle orifice 11 are covered with the insulating cover 33 made from a non-conductive material, preferably ceramic. This electrically insulates the plasma gas stream from the conductive nozzle body 10*c* and ensures that the pilot arc will not contact the nozzle 10. The nozzle body 10*c* is supported by the nozzle carrier 31, which preferably is made of non-conductive material.

Figure 7:
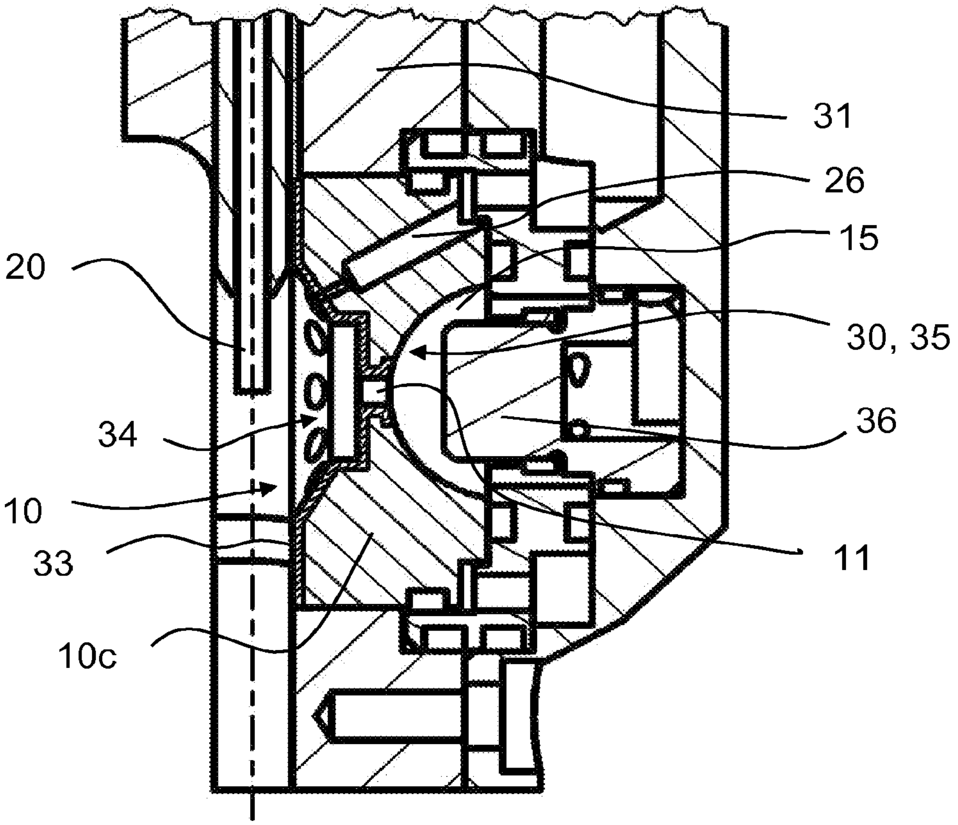
FIG. 7 is an enlarged cross section of a spray gun with a nozzle comprising a non-conductive cover and acting as second electrode.

FIG. 7 shows schematically a section through a torch head similar to FIG. 6. The nozzle 10 comprises an insulating cover 33 as the electric insulation on the front side 34 and in the nozzle orifice 11. The nozzle body 10*c*, made of a conductive material like copper or brass, is electrically connected to the power source and is acting at its back side 35 as the second electrode 30. The center part 36 in the plasma source 15 is build as a swirl generator to obtain the swirl in the plasma stream. The nozzle body 10*c* is supported by the nozzle carrier 31, which preferably is made of non-conductive material. Preferably the secondary gas inlets 26 are covered with a non-conductive layer.

Figure 8:
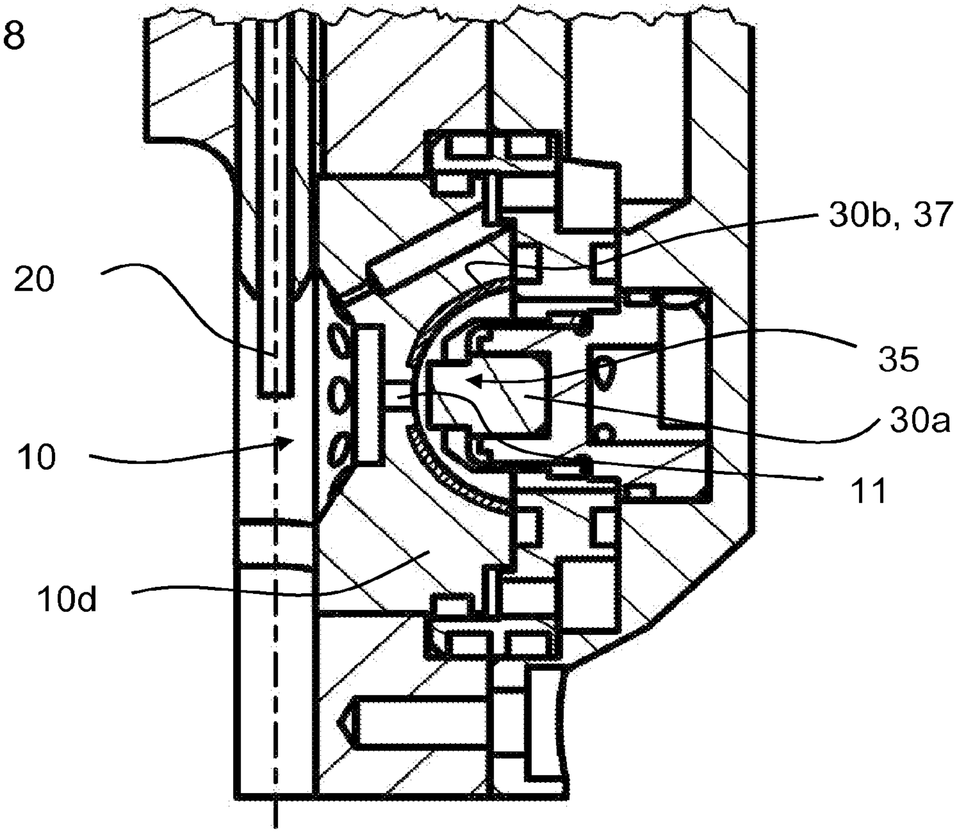
FIG. 8 is an enlarged cross section of a spray gun with an insulating nozzle comprising a conductive cover acting as second electrode.

FIG. 8 shows schematically a section through a torch head with a nozzle 10 similar to FIG. 7, but the conductivity in the nozzle 10 is the other way round. The nozzle body 10*d* itself is made of a non-conductive material. At its back side 35 the nozzle 10 comprises a conductive layer 37, which is electrically connected to the second center electrode 30*a* and therefore the conductive layer 37 is acting as a second nozzle electrode 30*b*. Which such nozzle 10 it is also possible to have no center electrode 30*a* at all.

Figure 9:
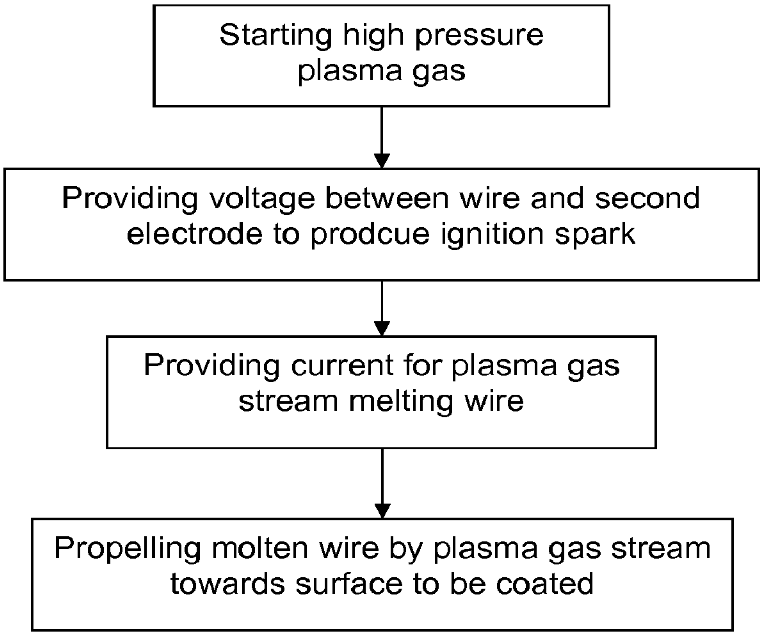
FIG. 9 is a flow sheet of the PTWA steps according to the invention.

FIG. 9 describes a method of the present invention, utilizing the plasma spray torch as described above. Accordingly, the method of the present invention comprises the following:

A plasma gas stream 16 is directed into the nozzle 10, passing the second electrode 30 and exiting the nozzle orifice 11 as plasma gas jet 12.

Switching on the power forms immediately a plasma arc between the free end 21 of the wire 20 and the second electrode 30, thus melting the free wire end 21.

The molten metal of wire 20 is atomized by the plasma gas jet 12 and propelled as atomized metal spray 18 onto the surface 40 for forming the metal coating thereon.

This start-up process does not require any regulation of the process parameters. The process can start with the wire feed rate, the voltage or current of the power supply, the flow rate and the chemical composition of the plasma gas stream 16 as they are required during the spray process. This allows a significant reduction in the control effort of the start-up process, accelerates the start-up because the spray process starts immediately, and it saves wire material, gas and electrical power.

In general it is preferred to introduce a plasma gas under pressure tangentially into the nozzle and creating a vortex flow around the second electrode and exiting the restricted nozzle orifice. Furthermore, the method optionally includes directing a secondary gas stream towards the wire free end in the form of an annular conical gas stream passing by the wire free end and having a point of intersection spaced downstream of the wire free end. When an interior concave surface such as a cylinder bore of a piston of a combustion engine is to be coated, the method will include rotating and translating the nozzle and the second electrode as an assembly about a longitudinal axis of the wire while maintaining an electrical connection and an electrical potential between the wire and the second electrode, thereby directing the atomized molten feedstock rotationally and coating an internal arcuate surface with the dense metal layer. Moreover, the assembly and method of the present invention are able to coat bores of diameter equal to or greater than about 3 cm. More preferably, the torch assembly of the present invention is useful in coating bores having a diameter from about 3 cm to about 20 cm.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

REFERENCES

10 Nozzle
10*a* Outer part of nozzle 10
10*b* Inner part of nozzle 10
10*c* Nozzle body
11 Nozzle orifice
12 Plasma jet
13 Laval nozzle
14 Secondary gas
15 Plasma gas source
16 Plasma gas stream
18 Metal spray
20 Wire (first electrode)
21 Wire free end
22 Wire guide
24 Secondary gas orifice
26 Secondary gas inlet
30 Second electrode
30*a* Second center electrode
30*b* Second nozzle electrode
31 Nozzle carrier
32 Insulating body
33 Insulating cover
34 Front side of nozzle
35 Back side of nozzle
36 Center part
37 Conductive layer
40 Surface

The invention claimed is:

1. A method of starting a plasma transferred wire arc thermal spray apparatus, comprising:

directing a plasma gas stream into a nozzle passing a second electrode and exiting a nozzle orifice as plasma gas jet;

switching on electrical power with full power to form a plasma arc between a wire free end of a wire and the second electrode thereby melting the wire free end without a pilot arc between the nozzle and the second electrode; and atomizing a molten wire by the plasma gas jet and propelling an atomized metal spray onto a surface for forming a metal coating thereon.

2. A method of claim 1, wherein wire feed rate, voltage or current of power supply, flow rate and chemical composition of the plasma gas stream, are the same during start of the spray process and during the spray process.

* * * * *